United States Patent Office 3,719,654

Patented Mar. 6, 1973

3,719,654

PROCESS FOR PREPARING METAL SALTS OF TALL OIL

James N. Stone, Augusta, Ga., assignor to Continental Can Company, Inc., New York, N.Y.

No Drawing. Filed Apr. 19, 1971, Ser. No. 135,454
Int. Cl. C09f *1/04*
U.S. Cl. 260—97.5 5 Claims

ABSTRACT OF THE DISCLOSURE

A process for preparing metal tallates wherein tall oil soap is reacted with an acid metal salt in an aqueous media and the metal tallate is extracted from the aqueous media using a water immiscible organic solvent in which the metal tallate is soluble.

BACKGROUND OF THE INVENTION

(1) Field of invention

The present invention relates to metal salts of tall oil and more particularly to a process of producing such metal salts directly from tall oil soap.

(2) The prior art

As is well known in the paper and pulp industry, when paper pulp is produced by the Kraft or sulfate process and the black liquor is evaporated, a scum known as tall oil soap or sulfate soap separates from the black liquor upon cooling and floats upon its surface. The precise concentration to which the black liquor must be evaporated is governed by its viscosity and alkalinity, and those skilled in the art know at what specific gravity of heating each separate batch of black liquor may be stopped and the cooling begun.

The soap is then skimmed off from the evaporated black liquor and acidulated, whereupon, after settling, there is a separation of the mass into three layers, tall oil, lignin and spent acid the upper of which contains the crude tall oil, which is removed. This tall oil consists essentially of a mixture of fatty acids of the oleic, linoleic, and linolenic series with colophonic or rosin acids, such as abietic acid, each being somewhat more than 40% of the total. There is also about 5 to 15% of inert unsaponifiable matter of non-acidic character. The relative proportions of the three main groups of constituents is tall oil, viz., rosin acids, fatty acids, and inerts will vary with the kind of wood used, the pulping process, and the season of logging, but, generally speaking, about 45% rosin acids, about 45% fatty acids, and about 10% of unsaponifiable inerts is fairly representative average analysis.

The crude tall oil is refined by dissolving the tall oil in a naphtha solvent and reacting the dissolved tall oil with sulfuric acid to effect the removal of the odor and color producing substances present in the crude oil. Following the acid treatment, a black sludge, containing most of the color and odor bodies, settles to the bottom of the tank and is drawn off. The remaining solution is washed with water and a dilute alkali solution to remove any residual sulfuric acid. The tall oil solution is stripped with steam to vaporize the naphtha, which is then condensed for reuse.

The metal soaps of acid refined tall oil prepared in the above manner such as the cobalt, manganese, zinc, iron, lead and copper tallates have found wide usage as paint driers, lubricants, fungicides and waterproofing agents.

The metal soaps are conventionally prepared by the so-called precipitation process wherein the refined tall oil is reacted with sodium hydroxide at about 90–95° C. to prepare the sodium tallate. The sodium tallate is then reacted at the same temperature with an aqueous solution of an acid metal salt containing the metal ion desired for the resultant metal tallate wherein the metal tallate precipitates from the reaction media and is recovered by filtration and dried.

SUMMARY OF THE INVENTION

In accordance with the present invention there is provided a simple and low cost method to produce metal tallate salts which comprises separating the tall oil soap from the black liquor produced in the kraft process, reacting the separated tall oil soap with an aqueous solution of an acid metal salt to prepare an aqueous mixture containing the metal tallate salt and then extracting the metal tallate salt from the mixture wih a water immiscible organic solvent in which the metal tallate salt is soluble and then recovering the metal tallate from the organic solvent.

By the process of the present invention, metal tallates are prepared directly from tall oil soap skimmings. By preparing metal tallates directly from tall oil soap, instead of refined tall oil as is the present practice in the art, a substantial reduction in the cost of preparing these compounds is effected thereby broadening the commercial usage thereof.

PREFERRED EMBODIMENTS

The term "tall oil soap" as used in the present specification and claims means the art recognized tall oil soap obtained from the skimmings of evaporated black liquor of the Kraft process which have received no treatment that is conventional in the refining of tall oil.

Acid metal salts which may be reacted with the tall oil soap to prepare the metal tallate include sulfates of copper, cobalt, iron, zinc, manganese and lead such as $CuSO_4$, $CoSO_4$, $FeSO_4$, $ZnSO_4$, $MnSO_4$, and $PbSO_4$ and chlorides such as $CuCl_2$, $CoCl_2$, $FeCl_2$, $MnCl_2$ and $PbCl_2$.

Generally the tall oil soap is reacted with the acid metal salt at a weight ratio of tall oil soap solids to metal salt of about 2:1 to about 4:1 with a weight ratio of about 3:1 being preferred.

To efficiently react the tall oil soap with the acid metal salt it is preferred that the tall oil soap be diluted with water at a weight ratio of water to tall oil soap of about 3:1 to about 6:1 or more.

The tall oil soap is reacted with the acid metal salt at a temperature of about 35° to about 95° C. and preferably at a temperature of 40° to 50° C. Reaction times at these temperatures may vary from 0.5 to 15 minutes depending upon the dilution of the tall oil soap. At dilutions wherein the weight ratio of water to tall oil soap solids is approximately 1:1, the reaction time period required to obtain substantially complete conversion of the tall oil soap to the desired metal tallate requires about 10 to 15 minutes at 50° to 65° C. whereas when the dilution weight ratio of water to tall oil soap is increased to 4:1 to 5:1 the reaction time required to prepare the metal tallate is reduced to 0.5 to 3.0 minutes at 40°–50° C.

After the reaction of the tall oil soap and acid metal salt is completed, the aqueous diluent is separated from the metal tallate reaction product by extraction with a water immiscible solvent that is capable of dissolving the metal tallate but is not soluble in water. Generally extraction of the metal tallate with a water immiscible solvent also separates the metal tallate from the unreacted water soluble odorants which are present in the tall oil soap skimmings.

Extraction is accomplished by mixing the aqueous reaction mixture with an equal volume of the organic solvent. After a suitable mixing time, e.g. 5 to 60 minutes, the mixture is allowed to settle and the bottom aqueous layer can be separated from the organic layer containing the metal tallate by any conventional method such as decantation, filtration or centrifugation. If desired, unreacted organic solvent soluble materials such as lignin, if objectionable, can be effectively eliminated from the organic soluble extract by washing the tall oil soap with a dilute solution of sodium hydroxide or sodium chloride before the tall oil soap is reacted with the heavy metal salt.

The water immiscible solvent can be separated from the metal tallate reaction product by distillation, simple heating or evaporation. In many cases the organic solvent need not be separated from the metal tallate reaction product as many commercial applications of metal tallate require that the tallate be supplied dissolved in an organic solvent.

Water immiscible solvents in which the metal tallates are soluble and which may be used to extract the metal tallate reaction product from the aqueous reaction medium include nonpolar solvents such as petroleum hydrocarbons such as gasoline, kerosene, heptane, mineral spirits, etc. and aromatic hydrocarbons such as benzene, toluene, xylene, naphtha and the like. By the process of the present invention 25 to 30% solutions of the metal tallate in an organic solvent may be obtained and which solutions can be sold directly to the commercial market.

The following example is illustrative of the present invention and is not to be construed as unduly limiting the invention.

EXAMPLE

In a series of test runs, 128 grams of tall oil soap skimmings at 78.3% solids and 400 ml. of water were mixed in a 2-liter beaker and the beaker placed in a heated water bath. After the tall oil soap skimmings and water solution had reached the desired temperature, 100 ml. of 40% $CuSO_4 \cdot 5H_2O$ solution which had also been warmed in the water bath, was added to the beaker with agitating. The final temperature and time to effect the completion of reaction were recorded. The completion of the reaction was indicated by the formation of a green water insoluble mass which settles to the bottom of the reaction vessel. The green mass was separated from the aqueous phase of the reaction mixture and then mixed with 180 grams of mineral spirits which rapidly dissolved with agitation the dark green copper tallate fraction of the green mass. After allowing the mixture to stand for 24 hours, the mixture separated into two layers; the watery lower layer, was drained off and discarded, the non-aqueous, organic upper layer contained about 25 to 30 percent by weight dissolved copper tallate. The mineral spirits fraction was then evaporated to recover the copper tallate. The reaction conditions and yields are recorded in the following table:

TABLE

| | Temperature of reaction, ° C. | Time for completion of reaction, min. | Yield, grams | Percent copper |
|---|---|---|---|---|
| Run No.: | | | | |
| 1 | 71 | 1.5 | 63.1 | 8.03 |
| 2 | 82 | 0.5 | 64.0 | 8.09 |
| 3 | 52 | 0.5 | 57.8 | 7.65 |
| 4 | 42 | 0.5 | 48.0 | |

What is claimed is:

1. A process for preparing a metal tallate which comprises reacting crude tall oil soap obtained directly and without further refining from the skimmings of evaporated black liquor of the Kraft process with an acid salt of a metal selected from the group consisting of copper, cobalt, iron, zinc, manganese and lead at a weight ratio of tall oil soap solids to salt of about 2:1 to about 4:1 in an aqueous reaction medium at a temperature of about 35° C. to about 95° C. to prepare the metal tallate,
   adding to and mixing with the reaction medium a water immiscible organic solvent in which the metal tallate is soluble,
   permitting the aqueous and organic solvent layers to separate,
   and then removing the organic solvent layer to recover the mettal tallate.

2. The process of claim 1 wherein the metal salt is reacted with the tall oil soap at a weight ratio of tall oil soap solids to metal salt of about 2:1 to about 4:1.

3. The process of claim 1 wherein prior to the reaction of the tall oil soap with the metal salt, the tall oil soap is mixed with water at a weight ratio of water to tall oil soap of about 3:1 to about 6:1.

4. The process of claim 1 wherein the tall oil soap is reacted with the metal salt at a temperature of about 35° C. to about 95° C. for 0.5 to 15 minutes.

5. The process of claim 1 wherein the metal salt is selected from the group consisting of $CuSO_4$, $CoSO_4$, $FeSO_4$, $MnSO_4$ and $PbSO_4$.

References Cited

UNITED STATES PATENTS 2,265,020 12/1941 Beach ........ 260—97.5
2,334,762 11/1943 Hasselstrom ........ 260—97.5
2,306,352 12/1942 Burrell ........ 260—97.5
2,175,491 10/1939 Stresen-Reuter ........ 260—97.5

OTHER REFERENCES

Harris, G.: "Encyclopedia of Chemical Technology," 1953, pp. 800 to 802.

DONALD E. CZAJA, Primary Examiner

W. E. PARKER, Assistant Examiner